(12) United States Patent
Koski et al.

(10) Patent No.: US 6,344,720 B1
(45) Date of Patent: Feb. 5, 2002

(54) CURRENT MODE PWM TECHNIQUE FOR A BRUSHLESS MOTOR

(75) Inventors: John Alexander Koski; Nhan Bui, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,674

(22) Filed: Oct. 28, 1999

(51) Int. Cl.[7] .................................................. H02P 6/08
(52) U.S. Cl. ........................ 318/254; 318/439; 318/722
(58) Field of Search ................................. 318/138, 254, 318/432, 433, 439, 700, 720, 721, 722, 724

(56) References Cited

U.S. PATENT DOCUMENTS

| | | |
|---|---|---|
| 4,146,827 A | 3/1979 | Krohn |
| 4,368,411 A | 1/1983 | Kidd |
| 4,528,486 A * | 7/1985 | Flaig et al. .................. 318/254 |
| 4,544,868 A | 10/1985 | Murty |
| 4,749,923 A * | 6/1988 | Chieng ........................ 318/269 |
| 5,382,890 A | 1/1995 | Moh et al. |
| 5,675,699 A | 10/1997 | Yamamoto et al. |
| 5,731,672 A | 3/1998 | Miyaguchi |
| 6,057,663 A * | 5/2000 | Galbiati et al. ............. 318/599 |
| 6,078,161 A * | 6/2000 | Kim et al. ................... 318/701 |
| 6,122,234 A * | 9/2000 | Fujitani et al. ............... 369/50 |
| 6,153,989 A * | 11/2000 | Kardash et al. ............. 318/254 |

* cited by examiner

Primary Examiner—Bentsu Ro

(57) ABSTRACT

A current mode pulse width modulation (PWM) technique for brushless motors. The present system and method controls a brushless motor by increasing or decreasing motor speed respectively according to the polarity and value of a pulse width modulation (PWM) control signal. The PWM signal varies according to an error signal generated in proportion to the difference between a desired motor current and an actual motor current. A motor current sensor is used to sense an actual motor current being applied to the motor. A current comparator is used to compare the current desired reference signal and the actual current signal and to generate an error signal. A pulse width modulator is used to convert the error signal to a pulse-width modulated error signal. Armature position sensors are used for sensing armature positions of the motor. A commutator circuit receives the pulse-width modulated error signal and the armature positions of the motor. Power switches are coupled to outputs of the commutator and also coupled to the motor. The commutator controls activation and deactivation of the respective power switches based on the corresponding pulse-width modulated error signal to control the motor at a desired motor current that corresponds to the desired reference current signal. The commutator controls the respective power switches to drive the motor in either a more positive, a more negative direction, or in the same manner to respectively increase, decrease, or maintain the motor speed when the error signal correspondingly has a generally positive, negative, or zero value.

22 Claims, 3 Drawing Sheets

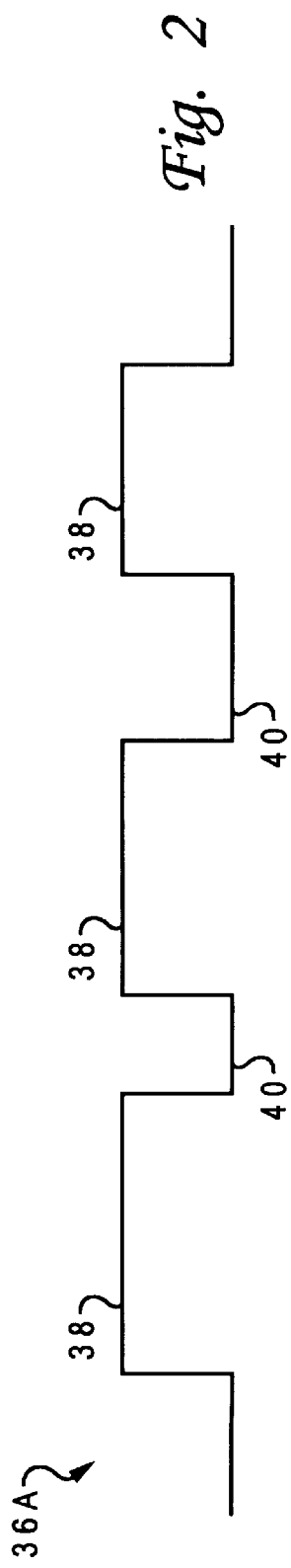
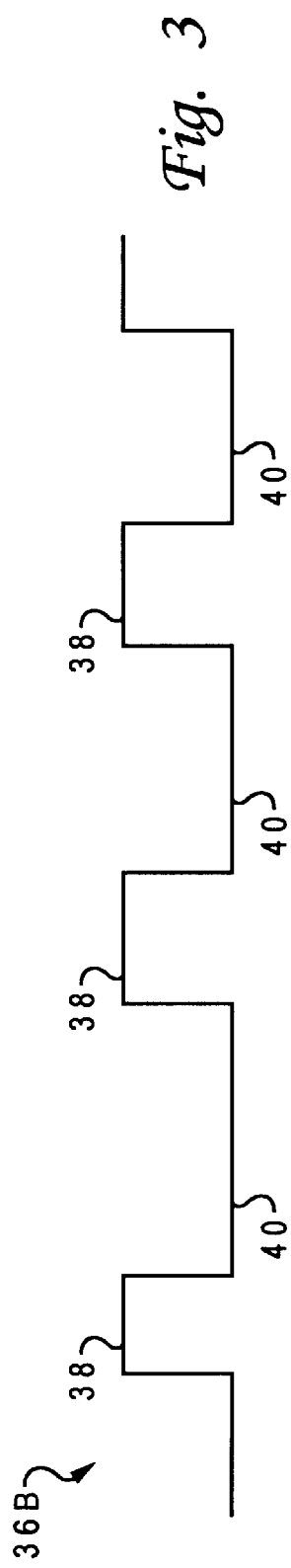
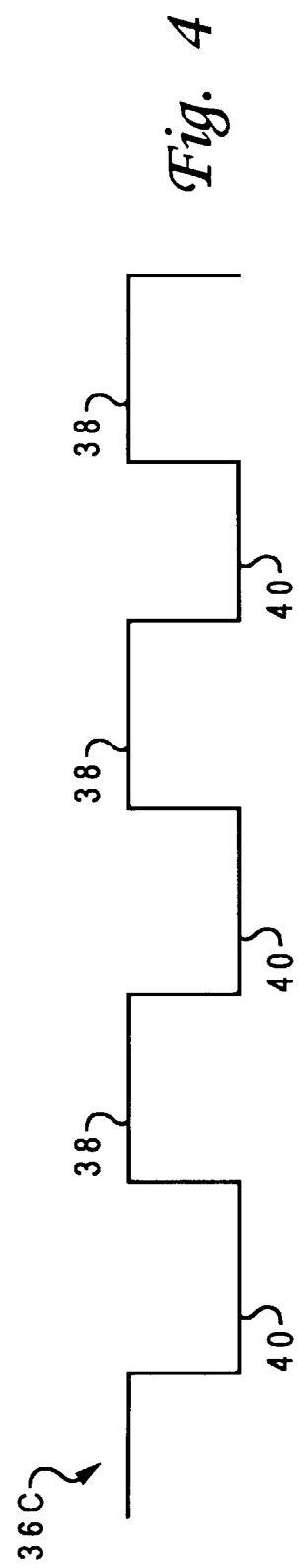

CURRENT MODE PWM TECHNIQUE FOR A BRUSHLESS MOTOR

BACKGROUND OF THE INVENTION

1. Technical Field

The present invention relates in general to a current mode pulse width modulation (PWM) technique for brushless motors and in particular to a system and method for controlling a brushless motor by increasing or decreasing motor speed respectively according to the positive polarity or negative polarity of a pulse width modulation (PWM) control signal wherein the PWM signal varies according to an error signal generated and derived between the difference of a desired motor speed and a current motor speed.

2. Description of the Related Art

Various systems and methods exist for controlling the speed of a brushless motor. One conventional prior art system and method involves using a pulse width modulation (PWM) signal to directly control the power switches to the brushless motor. For example, a three phase motor would have three upper switches and three lower switches to control the brushless motor. A pair of upper and lower switches is used to control each phase of the brushless motor. In this prior art system and method, the PWM signal controls the brushless motor in a manner such that the six switches are either on to excite the motor or off to turn off or slow down the motor speed. Thus, motor speed is increased by having the PWM signal activate the power switches to drive the motor, and motor speed is decreased by having the PWM signal deactivate the power switches to shut off the motor. Therefore, the motor is continuously and repeatedly switched between its on and off states resulting in full power excitation in one direction or coast condition.

Tape drives that use brushless motors to drive reels of tape for computer systems are in existence in the computer field. One type of tape drive, such as Linear Tape Open (LTO), involves two reels of tape wherein one of the two reels is a supply reel and the other of the two reels is a take-up reel. The supply reel is driven by a supply reel motor while the take-up reel is driven by a take-up reel motor. Control algorithms are used to control the speed of these two motors. For these types of tape drives or tape transports, the position and velocity of the tape need to be controlled. The control algorithms require the determination of the position and velocity of the tape in order to properly control the speed of the reel motors. The two tape reels, tape, and two motors that drive the reels are considered a plant. The plant receives multiple inputs and provides multiple outputs. For example, inputs to the plant are continuous currents to the motors for controlling the motors. The outputs from the plant are tape velocity, tape tension, and tape position.

These types of tape drives require that a desired motor speed for the tape drive be compared with the actual motor speed in order to properly control the tape position and velocity. If the desired motor speed is not equal to the actual motor speed, then the motor needs to be driven from the actual motor speed to the desired motor speed. It is therefore advantageous and desirable to provide a system and method for controlling the speed of a brushless motor according to and based on the difference between a desired motor speed and an actual motor speed. It is also advantageous and desirable to provide a system and method for controlling the speed of a brushless motor that uses a PWM signal that does not require the continuous and repeated turning on and off of the motor but that allows the brushless motor to be continuously driven. It is further advantageous and desirable to provide a system and method for controlling the speed of a brushless motor that uses a PWM signal for controlling the speed of a brushless motor according to and based on the difference between a desired motor speed and an actual motor speed. It is still also advantageous and desirable to provide a system and method for controlling the speed of a brushless motor that is used in a tape servo system and method. It is still further advantageous and desirable to provide a system and method for controlling the speed of a brushless motor based on armature positions of the brushless motor.

SUMMARY OF THE INVENTION

It is therefore one object of the present invention to provide a system and method for controlling the speed of a brushless motor according to and based on the difference between a desired motor speed and an actual motor speed.

It is another object of the present invention to provide a system and method for controlling the speed of a brushless motor that uses a PWM signal that does not require the continuous and repeated turning on and off of the motor but that allows the brushless motor to be continuously driven.

It is a further object of the present invention to provide a system and method for controlling the speed of a brushless motor that uses a PWM signal for controlling the speed of a brushless motor according to and based on the difference between a desired motor speed and an actual motor speed.

It is still a further object of the present invention to provide a system and method for controlling the speed of a brushless motor that is used in a tape servo system and method.

It is still another object of the present invention to provide a system and method for controlling the speed of a brushless motor based on armature positions of the brushless motor.

The foregoing objects are achieved as is now described. A current mode pulse width modulation (PWM) technique for brushless motors. The present system and method controls a brushless motor by increasing or decreasing motor speed respectively according to the polarity and value of a pulse width modulation (PWM) control signal. The PWM signal varies according to an error signal generated in proportion to the difference between a desired motor current and an actual motor current. A motor current sensor is used to sense an actual motor current being applied to the motor. A current comparator is used to compare the current desired reference signal and the actual current signal and to generate an error signal. A pulse width modulator is used to convert the error signal to a pulse-width modulated error signal. Armature position sensors are used for sensing armature positions of the motor. A commutator circuit receives the pulse-width modulated error signal and the armature positions of the motor. Power switches are coupled to outputs of the commutator and also coupled to the motor. The commutator controls activation and deactivation of the respective power switches based on the corresponding pulse-width modulated error signal to control the motor at a desired motor current that corresponds to the desired reference current signal. The commutator controls the respective power switches to drive the motor in either a more positive, a more negative direction, or in the same manner to respectively increase, decrease, or maintain the motor speed when the error signal correspondingly has a generally positive, negative, or zero value.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a PWM signal generated by the system in FIG. 1 when the desired motor current is greater than the actual motor current wherein the PWM signal has longer positive pulses than negative pulses generated based on an error signal having a positive value between the desired motor current and the actual motor current and wherein the PWM signal is used to control the power switches to increase the current of the brushless motor;

FIG. 3 is a PWM signal generated by the system in FIG. 1 when the desired motor current is less than the actual motor current wherein the PWM signal has shorter positive pulses than negative pulses generated based on an error signal having a negative value between the desired motor current and the actual motor current and wherein the PWM signal is used to control the power switches to decrease the speed of the brushless motor;

FIG. 4 is a PWM signal generated by the system in FIG. 1 when the desired motor current is equal to the actual motor current wherein the PWM signal has the same lengths as the positive pulses and the negative pulses generated based on an error signal having a zero value between the desired motor speed and the actual motor speed and wherein the PWM signal is used to control the power switches to maintain the speed of the brushless motor.

DESCRIPTION OF ILLUSTRATIVE EMBODIMENT

The present invention is a current mode pulse width modulation (PWM) technique for brushless motors. The present invention provides a present system 10 and method for controlling a brushless motor 20 by increasing or decreasing motor excitation respectively according to the positive polarity or negative polarity of a pulse width modulation (PWM) signal 36, such as PWM signal 36A or 36B or 36C. The PWM signal 36 varies according to an error signal 35 generated in proportion to the difference between a desired motor current and an actual motor current. The system 10 and method for controlling the current of a brushless motor uses a PWM signal 36 that does not require the continuous and repeated turning on and off of the brushless motor 20 and that is based on the generated error signal. The present system 10 and method for controlling the current of a brushless motor 20 is able to be used in a tape servo system and method. The present system 10 and method for controlling the speed of a brushless motor 20 is also based on armature positions of the brushless motor.

Figure 1:
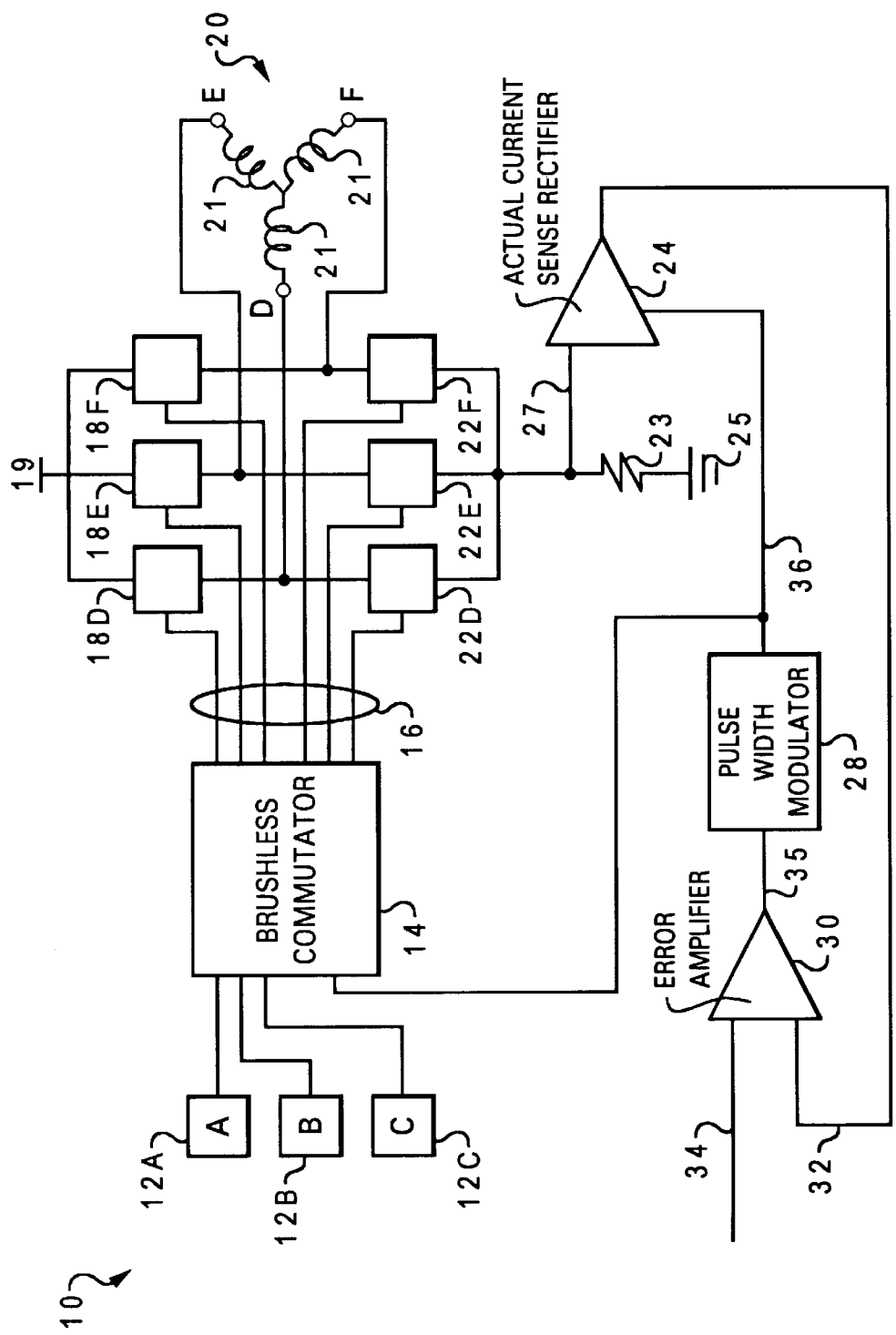
FIG. 1 is a block diagram of the present invention system for controlling the speed of a brushless motor according to and based on the difference between a desired motor speed and an actual motor speed wherein the system and method uses a PWM signal that varies according to an error signal generated between the difference of a desired motor current and an actual motor current.

With reference now to the figures and in particular with reference to FIG. 1, the present system 10 for controlling a brushless motor 20 by increasing or decreasing motor current respectively according to the positive polarity or negative polarity of a pulse width modulation (PWM) signal 36 is shown. The present system 10 controls the current of brushless motor 20. The brushless motor 20 is shown to have three phases or motor windings 21, which are phases or motor windings D, E, and F. Upper power switch 18D and lower power switch 22D are coupled to the winding D to control the brushless motor 20 thereat. Upper power switch 18E and lower power switch 22E are coupled to the winding E to control the brushless motor 20 thereat. Upper power switch 18F and lower power switch 22F are coupled to the winding F to control the brushless motor 20 thereat. The power switches 18D, 18E, 18F, 22D, 22E, and 22F are coupled to bulk power or a power source 19. The power source 19 provides the positive and negative driving power, such as +12 volts and −12 volts, to the brushless motor 20, through the selection of the appropriate switches 18 and 22. These power switches are excited by a PWM signal, such as PWM signal 36A or 36B or 36C respectively in FIGS. 2 and 3 and 4, according to the polarity of the PWM signal. The PWM signals 36A and 36B and 36C will be described in more detail later.

Hall sensors 12A, 12B, and 12C are coupled at the input side of a brushless commutator 14, and the power switches 18D, 18E, 18F, 22D, 22E, and 22F are coupled at the output side of the brushless commutator 14. The brushless commutator 14 is used to control the direction of and the drive on the motor windings D, E, and F to control the excitation of the brushless motor 20. While the motor control system 10 is in operation, the motor windings D, E, and F are either driving in one direction or an opposite direction. The hall sensors 12A, 12B, and 12C respectively sense and provide the armature position information from the brushless motor 20 for controlling the corresponding motor windings D, E, and F. A pulse width modulator 28 is also coupled to the input of the brushless commutator 14.

The pulse width modulator 28 has an error amplifier 30 coupled at its input. The input of the error amplifier is a current reference or desired current signal 34 and a current sense or actual current signal 32. The difference between desired current signal 34 and actual current signal 32 is determined and amplified by the error amplifier 30. The error amplifier 30 includes frequency compensation characteristics which assure stability of the motor current generated in the brushless motor and provides sufficient gain so that the difference between the desired and actual motor currents remain small for all normal conditions of motor speed. This difference is outputted from the error amplifier 30 in the form of an error difference signal 35. The error difference signal 35 is inputted into the pulse width modulator 28. The pulse width modulator 28 provides a pulse width modulation (PWM) signal 36, such as in the form of PWM signal 36A in FIG. 2 or PWM signal 36B in FIG. 3 or PWM signal 36C in FIG. 4. This PWM signal 36 is fed into the input of the brushless commutator 14.

The lower power switches 22D, 22E, and 22F are coupled to one end of a current sense resistor 23. The other end of the current sense resistor 23 is coupled to ground 25. The current sense or actual current signal 32 is derived from the current sense voltage signal 27 being applied at the current sense resistor 23. The current sense voltage signal 27 is inputted to an active current sense rectifier 24. The rectifier 24 also receives the PWM signal 36 from the pulse width modulator 28 so that the current sense or actual current signal 32 is changed and followed in direction according to the polarity of the PWM signal 36. The rectifier 24 accordingly determines and outputs the current sense or actual velocity current signal 32 based on the current sense voltage signal 27 at the current sense resistor 23 and the polarity of the PWM signal 36. The polarity of the PWM signal 36 determines the direction of motor excitation that the actual current will be driving the brushless motor 20.

The brushless commutator 14 controls the power switches 18D, 18E, 18F, 22D, 22E, and 22F and the brushless motor 20 in well known and well understood manners for brushless commutators. The present invention discloses that the brushless commutator 14 controls the brushless motor 20 by controlling a set of two power switches, that is, one set of two power switches is selected and activated while the other two sets of two power switches are kept de-activated. It is well known and understood as to how brushless commutator 14 is to determine and select which set of two power switches is to be activated and which sets of two power switches are to be de-activated. For example, if the brushless motor 20 is to be excited in the positive direction to increase motor speed by applying positive voltage between the windings D and E, then the upper power switch 18D and the lower power switch 22E are activated. The other power switches 18E, 18F, 22D, and 22F are de-activated. On the other hand, if the brushless motor 20 is to be excited in the negative direction to decrease motor speed by applying negative voltage between the windings D and E, then the upper power switch 18E and the lower power switch 22D are activated. The other power switches 18D, 18F, 22E, and 22F are de-activated.

With reference now to the figures and in particular with reference to FIG. 2, a PWM signal 36A is a digital signal generated by the system 10 in FIG. 1 when the desired motor speed is greater than the actual motor speed. The PWM signal 36A has longer positive pulses 38 than negative pulses 40. The length of these pulses 38 and 40 are generated based on an error signal 35 between the desired motor current and the actual motor current. In FIG. 2, the desired motor current is greater than the actual motor current. Thus, the overall error signal 35 is a positive signal to increase the actual motor current. The PWM signal 36A is used to control the power switches to increase the current of the brushless motor 20. The PWM signal 36A is provided to the rectifier 24 along with the input of the current sense voltage 27. The positive pulse 38 of the PWM signal 36A causes the brushless motor 20 to be driven in the positive excitation direction while the negative pulse 40 of the PWM signal 36A causes the brushless motor 20 to be driven in the negative excitation direction. Since overall the positive pulses 38 are longer than the negative pulses 40, then overall the brushless motor 20 will be driven in the positive excitation direction or manner to increase the motor current. The motor windings D, E, and F are continuously driven with positive excitation and negative excitation based on the on-time and off-time of the PWM signal 36A in the respective positive pulse 38 and the negative pulse 40, but overall the brushless motor 20 will be driven in the positive excitation direction to increase its current.

With reference now to the figures and in particular with reference to FIG. 3, a PWM signal 36B is a digital signal generated by the system 10 in FIG. 1 when the desired motor current is less than the actual motor current. The PWM signal 36B has shorter positive pulses 38 than negative pulses 40. The length of these pulses 38 and 40 are generated based on an error signal 35 between the desired motor current and the actual motor current. In FIG. 3, the desired motor current is less than the actual motor current. Thus, the overall error signal 35 is a negative signal to decrease the actual motor current. The PWM signal 36B is used to control the power switches to decrease the current of the brushless motor 20. The PWM signal 36B is provided to the rectifier 24 along with the input of the current sense voltage 27. The positive pulse 38 of the PWM signal 36B causes the brushless motor 20 to be driven in the positive excitation direction while the negative pulse 40 of the PWM signal 36B causes the brushless motor 20 to be driven in the negative excitation direction. Since overall the negative pulses 40 are longer than the positive pulses 38, then overall the brushless motor 20 will be driven in the negative excitation direction or manner to decrease the motor current. The motor windings D, E, and F are continuously driven with positive excitation and negative excitation based on the on-time and off-time of the PWM signal 36B in the respective positive pulse 38 and the negative pulse 40, but overall the brushless motor 20 will be driven in the negative direction to decrease its current.

With reference now to the figures and in particular with reference to FIG. 4, a PWM signal 36C is a digital signal generated by the system 10 in FIG. 1 when the desired motor current is equal to the actual motor current. The PWM signal 36C has the same length positive pulses 38 and negative pulses 40. The lengths of these pulses 38 and 40 are generated based on an error signal 35 between the desired motor current and the actual motor current. In FIG. 3, the desired motor current is equal to the actual motor current. Thus, the overall error signal is a zero value signal to maintain the actual motor current at the desired motor current. The PWM signal 36C is used to control the power switches to maintain the current of the brushless motor 20. The PWM signal 36C is provided to the rectifier 24 along with the input of the current sense voltage 27. The positive pulse 38 of the PWM signal 36C causes the brushless motor 20 to be driven in the positive excitation direction while the negative pulse 40 of the PWM signal 36C causes the brushless motor 20 to be driven in the negative excitation direction. Since overall the positive pulses 38 are the same lengths as the negative pulses 40, then overall the brushless motor 20 will be driven in the same manner to maintain the motor current. The motor windings D, E, and F are continuously driven with positive excitation and negative excitation based on the on-time and off-time of the PWM signal 36C in the respective positive pulse 38 and the negative pulse 40, but overall the brushless motor 20 will be driven in the same manner to maintain its current.

Figure 5:
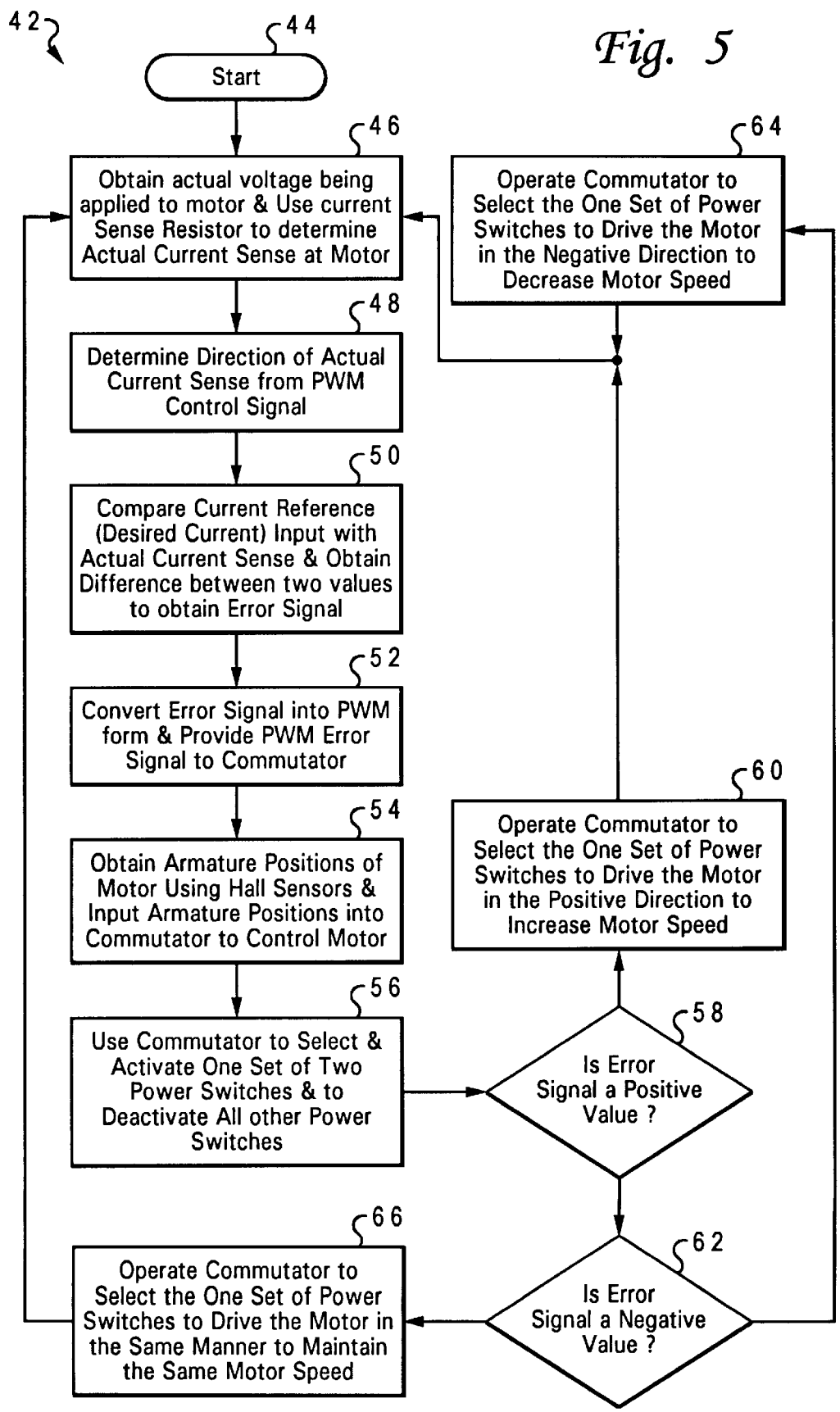
FIG. 5 is a flow chart diagram of the operational algorithm of the present invention system for controlling the speed of a brushless motor according to and based on the difference in proportion between a desired motor current and an actual motor current.

With reference now to the figures and in particular with reference to FIG. 5, a flow chart diagram of the algorithm 42 for the present system 10 that controls the speed of a brushless motor 20 according to and based on the difference in proportion between a desired motor current and an actual motor current is shown. The algorithm 42 starts at block 44. At block 46, the algorithm 42 obtains the actual voltage signal 27 being applied to brushless motor 20. The algorithm 42 uses the current sense resistor 23 to determine the actual current signal 32 of the brushless motor 20. At block 48, the algorithm 42 determines direction of actual current signal 32 from the present PWM signal 36. At block 50, the algorithm 42 compares a current reference input signal 34 with the actual current signal 32. A difference between these two signal values 34 and 32 is obtained to derive an error signal 35. At block 52, the error signal 35 is converted into a PWM signal 36, and the PWM signal 36 is provided to the brushless commutator 14. At block 54, armature positions of the brushless motor 20 are obtained using hall sensors 12A, 12B, and 12C. These armature positions are also inputted into the brushless commutator 14 to control the brushless motor 20. At block 56, the brushless commutator 14 is used to select and activate one set of two power switches to control the brushless motor 20 and to deactivate all other power switches.

The algorithm 42 moves to decision block 58. At decision block 58, the algorithm 42 determines whether the PWM signal 36 has a positive value. If it does, then the algorithm 42 moves to block 60 where the brushless commutator 14 operates to select the one set of power switches to drive the brushless motor 20 in the positive direction to increase motor speed and then loops back to block 46 to continue therefrom. If it does not, then the algorithm moves to decision block 62. At decision block 62, the algorithm 42 determines whether PWM signal 36 has a negative value. If it does, then the algorithm 42 moves to block 64 where the brushless commutator 14 operates to select the one set of power switches to drive the brushless motor 20 in the negative direction to decrease the motor speed and then loops back to block 46 to continue therefrom. If it does not, then the error signal equals zero, and the algorithm moves to block 66. At block 66, the brushless commutator 14 is operated to select the one set of power switches to drive the brushless motor 20 in the same manner to maintain the same motor speed. The algorithm 42 then loops back to block 46 and continues therefrom.

While the invention has been particularly shown and described with reference to a preferred embodiment, it will be understood by those skilled in the art that various changes in form and detail may be made therein without departing from the spirit and scope of the invention.

What is claimed is:

1. A system for controlling a motor speed of a brushless motor, said system comprising:
    a motor current sensor coupled to the motor for sensing an actual motor current applied to the motor, said motor current sensor including:
        a current sense resistor coupled to an actual voltage being applied to the motor and a reference voltage, and
        a rectifier, coupled to the current sense resistor, that generates the actual motor current having an appropriate magnitude and polarity,
    a current comparator coupled to a current reference and the actual current, wherein the current comparator compares the current reference and the actual current and generates an error signal,
    a pulse width modulator, coupled to the current comparator, that converts the error signal to a corresponding pulse-width modulated error signal, said pulse-width modulated error signal being coupled to said rectifier,
    armature position sensors that sense armature positions of the motor,
    a commutator having outputs and having inputs coupled to the pulse width modulator and the armature position sensors, and
    power switches coupled to outputs of the commutator and also coupled to the motor, wherein the commutator controls activation and deactivation of the power switches based on the pulse-width modulated error signal to control the motor at a desired motor speed that corresponds to the current reference.

2. The system according to claim 1, wherein the current comparator comprises an error amplifier that receives the current reference and the actual current and generates and amplifies the error signal.

3. The system according to claim 1, wherein the brushless motor is a three phase motor having three motor windings.

4. The system according to claim 3, wherein the armature position sensors comprise three armature position sensors for sensing the armature positions of the three motor windings.

5. The system according to claim 3, wherein the power switches comprise three sets of power switches each including two power switches, wherein the three sets are coupled to outputs from the commutator and are respectively coupled to the three motor windings.

6. The system according to claim 1, wherein the power switches are controlled by the commutator to drive the motor to increase the motor speed when the error signal has a generally positive value.

7. The system according to claim 1, wherein the power switches are controlled by the commutator to drive the motor to decrease the motor speed when the error signal has a generally negative value.

8. The system according to claim 1, wherein the power switches are controlled by the commutator to drive the motor to maintain motor speed when the error signal has a zero value.

9. The system according to claim 1, wherein the commutator continuously drives the motor through the power switch in accordance with the pulse-width modulated error signal.

10. An electric motor including a control system in accordance with claim 1.

11. A method for controlling a motor speed of a brushless motor, said method comprising:
    sensing an actual motor current being applied to the motor, wherein sensing actual motor current comprises:
        coupling a current sense resistor to an actual voltage being applied to the motor and a reference voltage to determine a value of the actual motor current, and
        using a rectifier coupled to the current sense resistor and a pulse-width modulated error signal to generate the actual motor current having an appropriate magnitude and polarity,
    comparing a current reference and the actual motor current,
    generating an error signal based on a difference between the current reference and the actual motor current,
    converting the error signal to the pulse-width modulated error signal,
    sensing armature positions of the motor, and
    controlling activation and deactivation of respective power switches based on the pulse-width modulated error signal to control the motor at a desired motor speed that corresponds to the current reference.

12. The method according to claim 11, wherein the steps of comparing a current reference and generating an error signal further comprise:
    in response to receipt of the current reference signal and the actual current as inputs, an error amplifier comparing the current reference and the actual current and generating and amplifying the error signal.

13. The method according to claim 11, wherein the controlling step further comprises:
    using a commutator having the pulse-width modulated error signal and the armature positions as input values and motor switch control signals as output values to control the motor at a desired motor speed that corresponds to the current reference.

14. The method according to claim 11, wherein the brushless motor is a three phase motor having three motor windings, and wherein the step of sensing armature positions further comprises:

using three armature position sensors for respectively sensing the armature positions of the three motor windings.

16. The method according to claim 11, wherein the brushless motor is a three phase motor having three motor windings, and wherein the step of controlling activation and deactivation of respective power switches further comprises:

coupling three sets of power switches each including two power switches to respective outputs of a power switch controller and to the three motor windings.

16. The method according to claim 15, wherein the step of controlling activation and deactivation of respective power switches further comprises:

using a commutator to activate one of the three sets of power switches and to deactivate the other two of the three sets of power switches to drive the motor to increase the motor speed when the error signal has a generally negative value.

17. The method according to claim 15, wherein the step of controlling activation and deactivation of respective power switches further comprises:

using a commutator to activate one of the three sets of power switches and to deactivate the other two of the three sets of power switches to drive the motor to decrease the motor speed when the error signal has a generally negative value.

18. The method according to claim 15, wherein the step of controlling activation and deactivation of respective power switches further comprises:

using a commutator to activate one of the three sets of power switches and to deactivate the other two of the three sets of power switches to drive the motor to maintain motor speed when the error signal has a zero value.

19. The method according to claim 11, wherein the step of controlling activation and deactivation of respective power switches further comprises:

using a commutator to control the power switches to drive the motor to increase the motor speed when the error signal has a generally positive value.

20. The method according to claim 11, wherein the step of controlling activation and deactivation of respective power switches further comprises:

using a commutator to control the power switches to drive the motor to decrease the motor speed when the error signal has a generally negative value.

21. The method according to claim 11, wherein the step of controlling activation and deactivation of respective power switches further comprises:

using a commutator to control the power switches to drive the motor to maintain the same motor speed when the error signal has a zero value.

22. The method according to claim 11, said controlling step comprising continuously driving the motor through the power switch in accordance with the pulse-width modulated error signal.

* * * * *